(12) United States Patent
Booth et al.

(10) Patent No.: US 12,497,325 B2
(45) Date of Patent: Dec. 16, 2025

(54) COMPOSITION, PASTE AND METHODS

(71) Applicant: FENZI AGT NETHERLANDS B.V., Maastricht (NL)

(72) Inventors: Jonathan Charles Shepley Booth, Reading (GB); Svetlana Emelianova, Maastricht (NL); Hong Ren, Reading (GB); Maxence Valla, Maastricht (NL)

(73) Assignee: FENZI AGT NETHERLANDS B.V., Maastricht (NL)

( * ) Notice: Subject to any disclaimer, the term of this patent is extended or adjusted under 35 U.S.C. 154(b) by 855 days.

(21) Appl. No.: 17/770,034

(22) PCT Filed: Sep. 4, 2020

(86) PCT No.: PCT/GB2020/052115
§ 371 (c)(1),
(2) Date: Apr. 18, 2022

(87) PCT Pub. No.: WO2021/074560
PCT Pub. Date: Apr. 22, 2021

(65) Prior Publication Data
US 2022/0396520 A1 Dec. 15, 2022

(30) Foreign Application Priority Data

Oct. 17, 2019 (GB) ..................................... 1915010

(51) Int. Cl.
*C03C 8/24* (2006.01)
*C03C 3/066* (2006.01)
*C03C 8/08* (2006.01)

(52) U.S. Cl.
CPC ................ *C03C 8/24* (2013.01); *C03C 3/066* (2013.01); *C03C 8/08* (2013.01)

(58) Field of Classification Search
None
See application file for complete search history.

(56) References Cited

U.S. PATENT DOCUMENTS 4,741,849 A * 5/1988 Naito .................... G11B 5/1272
5,013,360 A * 5/1991 Finkelstein ........... C03C 14/004
501/15

(Continued)

FOREIGN PATENT DOCUMENTS

CN 101164942 4/2008 ............... C03C 8/24
CN 108298822 7/2018 ............... C03C 8/24

(Continued)

OTHER PUBLICATIONS

International Search Report and Written Opinion issued in PCT/GB2020/052115, dated Nov. 25, 2020, 13 pages.

(Continued)

*Primary Examiner* — Maria V Ewald
*Assistant Examiner* — Ethan A. Utt
(74) *Attorney, Agent, or Firm* — HAYES SOLOWAY P.C.

(57) ABSTRACT

Disclosed is a composition for sealing inorganic substrates. The composition includes a glass frit and optionally a filler material, wherein the glass frit contains: 30 to 65 wt % $V_2O_5$; 5 to 35 wt % $P_2O_5$; 0 to 30 wt % $TeO_2$; 0 to 30 wt % $Bi_2O_3$; 0 to 15 wt % ZnO; 0 to 10 wt % MnO; 0 to 5 wt % $B_2O_3$; 0 to 5 wt % total alkali metal oxides; 0 to 2 wt % $Nb_2O_5$; 0 to 2 wt % $WO_3$; 0 to 2 wt % $MoO_3$; 0 to 2 wt % $SiO_2$; and 0 to 2 wt % $Al_2O_3$.

17 Claims, 4 Drawing Sheets

(a)

(b)

(56) References Cited

U.S. PATENT DOCUMENTS

| 2009/0199897 A1* | 8/2009 | Naito | H01J 9/261 |
| --- | --- | --- | --- |
| | | | 501/14 |
| 2010/0009836 A1* | 1/2010 | Sakoske | C03C 17/04 |
| | | | 501/14 |
| 2010/0180934 A1 | 7/2010 | Naito et al. | 136/252 |
| 2012/0213954 A1 | 8/2012 | Dennis | 428/34 |
| 2012/0321902 A1 | 12/2012 | Kohara et al. | |
| 2015/0337106 A1 | 11/2015 | Kajihara et al. | |
| 2016/0096768 A1* | 4/2016 | Takao | C03C 3/062 |
| | | | 428/34 |

FOREIGN PATENT DOCUMENTS

| CN | 109133648 | 1/2019 | C03C 8/24 |
| --- | --- | --- | --- |
| JP | 2006-342044 | 12/2006 | C03C 3/21 |
| JP | 2018-507836 | 3/2018 | C03C 3/21 |
| KR | 20060116171 | 11/2006 | C03C 3/16 |
| KR | 10-2019-010765 | 9/2019 | C03C 8/08 |
| WO | WO 2012/141187 | 10/2012 | H01L 31/04 |
| WO | WO 2013/115101 | 8/2013 | H05B 33/04 |
| WO | WO 2016/123273 | 8/2016 | C03C 3/21 |
| WO | WO 2019/023444 | 1/2019 | C03C 3/21 |

OTHER PUBLICATIONS

International Preliminary Report on Patentability issued in PCT/GB2020/052115, dated Apr. 19, 2022, 6 pages.
Search Report issued in GB 2013911.9, dated Feb. 9, 2021, 1 page.

* cited by examiner

COMPOSITION, PASTE AND METHODS

FIELD OF THE INVENTION

The present invention relates to a composition and a paste suitable for forming a seal and/or bond between substrates, for example, glass or ceramic substrates. The present invention further relates to methods, articles and uses.

BACKGROUND

Glass frit is commonly employed in the formation of seals or bonds between inorganic substrates, such as glass substrates. In particular, glass frit may be used in the formation of hermetic seals in articles which require encapsulation of sensitive components in an inert atmosphere (such as organic light emitting diode (OLED) displays, plasma display panels, semiconductor chips, sensors, solar cells, optical components or the like), or in articles which comprise an evacuated void (such as vacuum insulated glass (VIG) window units).

Typically, glass frit is applied to a substrate in the form of a paste, for example, by screen-printing or digital printing. The paste may comprise particles of glass frit dispersed in a liquid dispersion medium. After application to a substrate the paste may undergo a drying step followed by a firing step. Prior to firing, the substrates to be sealed/bonded may be assembled in the required configuration with the glass frit sandwiched there-between. During firing, the frit undergoes heat treatment causing the frit to soften, flow and adhere to the substrates, thereby forming the bond or seal.

Conventional firing techniques have employed furnace-heating in which the entire assembly (i.e. the substrates to be sealed/bonded, frit and any components to be encapsulated within) is subjected to the heat treatment. However, in applications where the use of tempered glass substrates and/or coated glass substrates is desirable (for example, VIG window units), exposure to high temperature environments may reduce the temper strength of substrates and/or degrade coatings applied thereto. Further, the maximum temperature that may be employed during firing is dictated by the most heat sensitive component of the entire assembly. Thus, it may be desirable that fits to be employed in sealing/bonding applications have a low softening point.

Suitable glass frit compositions having a low softening point have conventionally comprised lead oxide as a major component. However, due to environmental concerns, the use of lead is now undesirable.

$V_2O_5$—$ZnO$—$P_2O_5$ based glass system have been employed as an alternative to lead-based glass compositions. However, even though this glass system generally exhibits a low softening point, its chemical durability and water resistance are poor.

Certain bismuth oxide containing compositions have been proposed as low softening point alternatives to lead-containing or vanadium-containing glass compositions. However, it has been found that undesirable crystallisation may occur during firing of such frits and that such frits may have a relatively narrow sealing temperature operating window. The "sealing temperature operating window" of a sealing composition may be considered to be the difference between the softening temperature and the temperature at which the onset of crystallisation occurs (crystallisation point). Crystallisation during firing may lead to reduced strength of the resulting bond or seal.

$TeO_2$-based frit compositions also exhibit very low softening points, but they undergo acute crystallisation even at low temperatures making them undesirable to be used as sealants.

Typically, glass frit compositions are also chosen to have a coefficient of thermal expansion (CTE) as close as possible to that of the substrates to be sealed so as to enhance the mechanical strength, reduce interfacial stress and improve crack resistance of the resulting seal/bond. Further, the composition of glass frit should be such that the resulting seal/bond has high chemical durability.

There remains a need in the art for compositions which provide an improved balance of properties. In particular, there remains a need in the art for compositions having reduced crystallisation tendencies and/or lower sealing temperatures and/or wider sealing temperature operating windows, which produce seals of adequate strength and chemical durability.

SUMMARY OF THE INVENTION

The present specification describes a composition for sealing inorganic substrates, the composition comprising a glass frit and optionally a filler material, wherein said glass frit comprises:

30 to 65 wt % $V_2O_5$;
5 to 35 wt % $P_2O_5$;
0 to 30 wt % $TeO_2$;
0 to 30 wt % $Bi_2O_3$;
0 to 15 wt % $ZnO$;
0 to 10 wt % $MnO$;
0 to 5 wt % $B_2O_3$;
0 to 5 wt % alkali metal oxides ($Li_2O+Na_2O+K_2O$);
0 to 2 wt % $Nb_2O_5$;
0 to 2 wt % $WO_3$;
0 to 2 wt % $MoO_3$;
0 to 2 wt % $SiO_2$; and
0 to 2 wt % $Al_2O_3$.

A filler material may be used, for example, for those compositions with a high CTE, such as >9.5 ppm.

The present specification also describes a paste for sealing inorganic substrates, the paste comprising:
(i) a glass powder which comprises one or more frit compositions, at least one of the frit compositions being as defined above;
(ii) Optionally, a low CTE material (which may be incorporated into one or more of the glass frits, into a filler material, or provided as a separate additional material); and
(iii) an organic medium.

The present specification also describes a method of preparing a paste comprising mixing:
(i) a composition as hereinbefore described; and
(ii) an organic medium.

The present specification also describes the use of a composition as hereinbefore described to form a paste and use of a composition or paste as hereinbefore described to form a seal or bond between two substrates. A method of forming a bond or seal between inorganic substrates is provided, the method comprising:
(i) providing a first inorganic substrate;
(ii) providing a second inorganic substrate;
(iii) depositing a paste as hereinbefore described onto at least a portion of at least one of the inorganic substrates;
(iv) drying said paste to form a dried coating;

(v) preferably pre-firing the dried coating to remove the organic binder (optionally the drying and organic binder removal steps may be performed in a single step);

(vi) assembling the first and second substrates such that the dried/pre-fired coating lies therebetween and in contact with both substrates; and (vii) firing said dried/pre-fired coating.

Also provided is an article comprising at least two inorganic substrates being connected by a bond or a seal, wherein the bond or seal is obtained or obtainable by the method as hereinbefore described.

BRIEF DESCRIPTION OF THE DRAWINGS

For a better understanding of the present invention and to show how the same may be carried into effect, certain embodiments of the present invention will now be described by way of example only with reference to the accompanying drawings, in which.

DETAILED DECRIPTION

Figure 1:
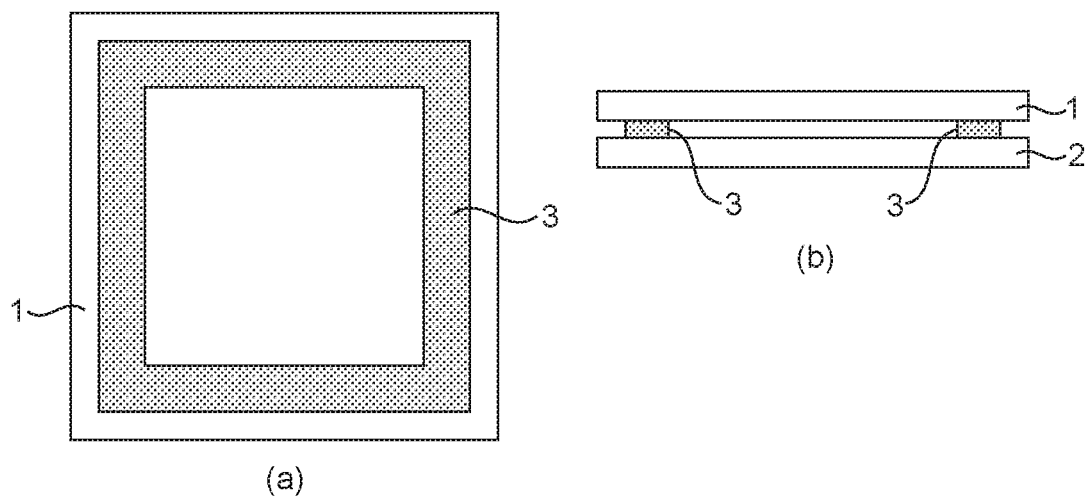
FIG. 1 shows an example of a sealed unit comprising two spaced apart substantially parallel glass substrates edge-sealed by a frit sealant material: (a) plan view; and (b) side view.

Preferred and/or optional features of the invention will now be set out. Any aspect of the invention may be combined with any other aspect of the invention unless the context demands otherwise. Any of the preferred and/or optional features of any aspect may be combined, either singly or in combination, with any aspect of the invention unless the context demands otherwise.

Where ranges are specified herein it is intended that each endpoint of the range is independent. Accordingly, it is expressly contemplated that each recited upper endpoint of a range is independently combinable with each recited lower endpoint, and vice versa.

The compositions of the glass frits described herein are given as weight percentages. These weight percentages are with respect to the total weight of the glass frit. The weight percentages are the percentages of the components used as starting materials in preparation of the glass frits, on an oxide basis. As the skilled person will understand, starting materials such as oxides, carbonates or nitrates may be used in preparing the glass frits of the present invention. Where a non-oxide starting material is used to supply a particular element to the glass frit, an appropriate amount of starting material is used to supply an equivalent molar quantity of the element had the oxide of that element been supplied at the recited wt %. This approach to defining glass compositions is typical in the art. As the skilled person will readily understand, volatile species (such as oxygen) may be lost during the manufacturing process of the glass frit, and so the composition of the resulting glass frit may not correspond exactly to the weight percentages of starting materials, which are given herein on an oxide basis. Analysis of an obtained glass frit by a process known to those skilled in the art, such as Inductively Coupled Plasma Emission Spectroscopy (ICP-ES), can be used to calculate the starting components of the glass frit composition in question.

It has been found that very high levels of $V_2O_5$ in glass frits result in poor chemical durability and is detrimental to the quality of the final seal. Furthermore, even though the chemical durability can be improved by lowering the $V_2O_5$ content in the glass frits, this results in an increased softening temperature ($T_f$) which affects the flow and therefore the sealing performance. Accordingly, the glass frits employed in the compositions of this specification comprise 30 to 65 wt % $V_2O_5$. Preferably, the glass frits employed in the compositions of the present specification comprise 32 to 55 wt % $V_2O_5$, more preferably 35 to 50 wt % $V_2O_5$, and even more preferably 38 to 48 wt % $V_2O_5$.

It has also been found that very high levels of $P_2O_5$ in glass frits results in poor chemical durability. Furthermore, even though the chemical durability can be improved by lowering the $P_2O_5$ content in the glass frits, this often results in an increased glass structure instability as well as thermal expansion coefficient. Accordingly, the glass frits employed in the compositions of the present specification comprise 5 to 35 wt % $P_2O_5$. Preferably, the glass frits employed in the compositions of the present specification comprise 10 to 30 wt % $P_2O_5$, more preferably 15 to 25 wt % $P_2O_5$, and even more preferably 15 to 23 wt % $P_2O_5$.

In compositions as described herein, low levels of $TeO_2$ can be incorporated in order to improve the chemical durability of resultant seals without adversely affecting the softening behaviour of the glass. However, addition of too high levels of $TeO_2$ can lead to acute crystallisation which is undesirable. Accordingly, the glass frits employed in the compositions of the present specification comprise 0 to 30 wt % $TeO_2$. Preferably, the glass frits employed in the compositions of the present specification comprise 5 to 25 wt % $TeO_2$, more preferably 8 to 25 wt % $TeO_2$, and even more preferably 10 to 20 wt % $TeO_2$.

In compositions as described herein, low levels of $Bi_2O_3$ can also be incorporated in order to improve the chemical durability of resultant seals without adversely affecting the softening behaviour of the glass. However, addition of too high levels of $Bi_2O_3$ can lead to increased thermal expansion as well as promoting crystallisation which are both undesirable. Accordingly, the glass frits employed in the compositions of the present specification comprise 0 to 30 wt % $Bi_2O_3$. Preferably, the glass frits employed in the compositions of the present specification comprise 5 to 25 wt % $Bi_2O_3$, more preferably 6 to 20 wt % $Bi_2O_3$, and even more preferably 7 to 12 wt % $Bi_2O_3$.

In compositions as described herein, the level of ZnO is lowered in comparison with the most common $V_2O_5$—ZnO—$P_2O_5$ frit compositions in order to improve chemical durability of resultant seals as well as inhibiting crystallisation in a low temperature region. However, a significantly reduced level of ZnO can lead to an increased thermal expansion as well as glass structure instability. Accordingly, the glass frits employed in the compositions of the present specification comprise 0 to 15 wt % ZnO. Preferably, the glass frits employed in the compositions of the present specification comprise 2 to 12 wt % ZnO, more preferably 5 to 10 wt % ZnO, and even more preferably 5 to 8 wt % ZnO.

In compositions as described herein, MnO is incorporated into the $V_2O_5$—ZnO—$P_2O_5$ frit compositions. It has been established from this invention that low level addition of MnO significantly reduces the crystallisation tendency of the glass. However, a substantially raised level of MnO can lead to an increased thermal expansion which was undesirable.

Accordingly, the glass frits employed in the compositions of the present specification comprise 0 to 10 wt % MnO. Preferably, the glass frits employed in the compositions of the present specification comprise 1 to 8 wt % MnO, more preferably 2 to 5 wt % MnO, and even more preferably 2 to 4 wt % MnO.

In compositions as described herein, low levels of $B_2O_3$ can be incorporated in order to improve glass structural stability without adversely affecting softening behaviour. However, addition of too high levels of $B_2O_3$ can lead to an inferior chemical durability and water resistance which is not desirable. Accordingly, the glass frits employed in the compositions of the present specification comprise 0 to 5 wt % $B_2O_3$. Preferably, the glass frits employed in the compositions of the present specification comprise 0 to 4 wt % $B_2O_3$, more preferably 0.5 to 3 wt % $B_2O_3$, and even more preferably 0.7 to 2 wt % $B_2O_3$.

In compositions as described herein, low levels of alkali metal oxides can be incorporated in order to improve glass structural stability without adversely affecting softening behaviour. However, addition of too high levels of alkali metal oxides can lead to an increased thermal expansion coefficient as well as weakened glass strength in the final seals. Accordingly, the glass frits employed in the compositions of the present specification comprise 0 to 5 wt % alkali metal oxides ($Li_2O+Na_2O+K_2O$) in total. Preferably, the glass frits employed in the compositions of the present invention comprise 0 to 4 wt % ($Li_2O+Na_2O+K_2O$) in total, more preferably 1 to 4 wt % ($Li_2O+Na_2O+K_2O$) in total, and even more preferably 1 to 3 wt % ($Li_2O+Na_2O+K_2O$) in total.

In addition, low levels of $Nb_2O_5$, $WO_3$, $MoO_3$, $Al_2O_3$ and $SiO_2$ can be incorporated into the frit compositions to modify the glass structure and thermal expansion behaviour. The doping level of the above oxides can be controlled in a range 0 to 2% to avoid significantly affecting softening in the sealing temperature range.

The glass frits employed in the compositions of the present specification preferably have a $d_{90}$ particle size of less than 50 μm. In some embodiments, the particles of the glass frit may have a $d_{90}$ particle size of 1 to 40 μm, preferably 2 to 30 μm, more preferably 3 to 20 μm.

The term "$d_{90}$ particle size" herein refers to particle size distribution, and a value for $d_{90}$ particle size corresponds to the particle size value below which 90%, by volume, of the total particles in a particular sample lie. The $d_{90}$ particle size may be determined using a laser diffraction method (e.g. using a Malvern Mastersizer 3000).

The glass frits employed in the compositions of the present specification preferably have a coefficient of thermal expansion (CTE) which is less than or equal to $10 \times 10^{-6}$/K, more preferably less than or equal to $9.5 \times 10^{-6}$/K, even more preferably less than or equal to $9.0 \times 10^{-6}$/K, as measured using a dilatometer. A suitable dilatometer is a DIL803 Dual Sample Dilatometer, which is available from TA Instruments.

The glass frits employed in the compositions of the present specification may be prepared by mixing together the required raw materials and melting them to form a molten glass mixture, then quenching to form a glass (melt/quench glass forming). The process may further comprise milling the resulting glass to provide glass frit particles of the desired particle size. For example, the glass may be milled using jet-milling process or a planetary dry milling process. The skilled person is aware of suitable alternative methods for preparing glass frit. Suitable alternative methods include sol-gel processes and spray pyrolysis.

The glass frit compositions of the present specification preferably have a dilatometric softening point temperature ($T_f$) in the range 300 to 500° C. For example, the glass frit compositions may have a $T_f$ in the range in the range 330 to 400° C.

As used herein, the term "softening point", or "$T_f$" means the first temperature at which indications of softening or deformation of a glass are observed, as measured by hot stage microscopy (HSM).

The glass frit compositions of the present specification preferably have a glass transition temperature ($T_g$) in the range 200 to 400° C. For example, the glass frit compositions may have a $T_g$ in the range 330 to 360° C.

As used herein, the term "glass transition temperature", or "$T_g$" means the glass transition temperature as measured according to the ASTM E967 "Standard Test Method for Assignment of the Glass Transition Temperature by Differential Scanning Calorimetry".

The compositions of the present specification comprise a filler material (also known as a CTE filler or a low expansion filler). As used herein, the term "filler material" is a material which lowers the CTE of a composition. Preferably, the compositions of the present invention comprise 1 to 15 wt %, more preferably 2 to 12 wt %, more preferably 3 to 8 wt % of a filler material based upon the total weight of the composition.

Preferably, the filler material is a zirconium oxide material, an aluminium oxide material, cordierite, or an aluminosilicate glass frit. More preferably, the filler material is an aluminosilicate glass frit having the following composition:

62-75 wt % $SiO_2$;
18-28 wt % $Al_2O_3$;
3-7 wt % CaO;
3-5 wt % ZnO;
1.5-4 wt % $Li_2O$;
2.3-3.8 wt % BaO; and
0.1-1 wt % MgO.

The aluminosilicate glass frit filler material may be prepared in the same manner as described above in relation to the glass frit employed in the compositions of the present specification.

The compositions of the present specification may be prepared by dry mixing the glass frit with the filler material (e.g. in a speed mixer).

In preferred embodiments, the compositions of the present specification are provided in the form of a paste. The pastes comprise:
(i) a composition as hereinbefore described, and
(ii) an organic medium.

The pastes of the present invention may be applied onto a substrate (e.g. via screen printing) in order to deposit the composition onto the substrate.

As used herein, the term "organic medium" refers to a substance which is in the liquid phase at the conditions intended for application of the paste to a substrate (i.e. printing conditions). Thus, at ambient conditions the organic medium may be solid or a liquid too viscous for printing. As the skilled person will readily understand, combination of the compositions as described herein with an organic medium to form the paste may take place at elevated temperature if required.

The organic medium to be employed may be selected on the basis of the intended method of applying the paste to a substrate.

In one embodiment, the dispersion medium adequately suspends the composition at application conditions and is removed completely during drying of the applied paste and/or firing of the deposited composition. Factors influencing the choice of medium include solvent viscosity, evaporation rate, surface tension, odour and toxicity. Suitable mediums preferably exhibit non-Newtonian behavior at printing conditions. Suitably, the medium comprises one or more of water, alcohols (e.g. tridecyl alcohol), glycol ethers, lactates, glycol ether acetates, aldehydes, ketones, aromatic hydrocarbons and oils. Mixtures of two or more solvents are also suitable.

Preferred pastes of the present specification comprise 70 to 95 wt % of a composition as described hereinbefore, more preferably 75 to 90 wt % (e.g. 87 wt %) based on the total weight of the paste, and 5 to 30 wt %, more preferably 10 to 25 wt % (e.g. 13 wt %) of an organic medium based on the total weight of the paste.

Preferred pastes of the present specification may further comprise one or more additives. These may include dispersants, binders, resins, viscosity/rheology modifiers wetting agents, thickeners, stabilisers and surfactants.

The pastes of the present specification are preferably substantially lead-free, that is, any lead-containing components are substantially absent from the paste. For example, the paste may comprise less than 0.1 wt. % lead.

The pastes of the present specification may be prepared by mixing:
(i) a composition as hereinbefore described; and
(ii) an organic medium.

The components may be mixed, for example, using a propeller mixer, a high shear mixer, or a bead-mill. In some embodiments, the organic medium and/or the combined components may be heated prior to and/or during mixing.

In some cases, it may be desirable to mill the compositions of the present invention to the desired particle size after they have been combined with the organic medium. Suitable milling techniques include bead milling, ball milling, basket milling or other appropriate wet milling techniques.

The pastes may be employed in a method of forming a bond or seal between inorganic substrates (e.g. in a method of forming a hermetic seal between two glass substrates), the method comprising:
(i) providing a first inorganic substrate;
(ii) providing a second inorganic substrate;
(iii) depositing a paste as hereinbefore described onto at least a portion of at least one of the inorganic substrates;
(iv) drying said paste to form a dried coating;
(v) pre-firing said coating at a given temperature;
(vi) assembling the first and second substrates such that the dried coating lies therebetween and in contact with both substrates; and
(vii) firing said pre-fired coating.

Deposition of the paste onto at least a portion of at least one of the inorganic substrates in step (iii), may be achieved by applying a layer of the paste hereinbefore described onto the portion of the substrate. The layer of paste may be applied to the inorganic substrate(s) via a suitable printing method. For example, the layer of paste may be applied to the inorganic substrate(s) via inkjet printing, screen printing, roller coating or by dispenser application. In a preferred embodiment, the paste is applied to the inorganic substrate(s) via screen printing.

The applied layer of paste preferably has a wet layer thickness in the range 10 to 60 microns, more preferably in the range 15 to 55 microns, even more preferably in the range 20 to 50 microns. The wet layer thickness of the applied layer of paste may vary depending on the intended end use of the final sealed articles.

After application of the paste layer to the inorganic substrate(s) and prior to firing, the applied coating undergoes a drying step (iv) for removal or partial removal of solvents present in the organic medium. Drying may be carried out at temperatures of up to 200° C., more preferably temperatures of up to 150° C. Drying may be carried out, for example, by air drying the applied layer at ambient temperature, by heating the paste-coated substrate in a suitable oven, or by exposing the paste-coated substrate to infrared radiation.

A pre-firing heat treatment up to 350° C. is applied to the dried coating to fully remove organic carrier/binder material.

On the final firing of the pre-fired coating, particles of the glass frit soften, flow and adhere to each of the substrates, thereby creating a bond or seal connecting the substrates. Advantageously, it has been found that the compositions of the present specification can achieve a hermetic seal, having high mechanical strength and chemical durability.

Preferably, the dried paste is fired via convective heating. Thus, in preferred methods, the dried paste is fired by heating the assembly of the first and second substrates with the dried paste lying therebetween and in contact with both substrates, to a temperature sufficiently high to cause particles of the glass frits to soften, flow and adhere to the substrate, and to burn off any remaining components deriving from the organic medium. For example, the firing may be carried out by heating the assembly to a temperature in the range 300 to 450° C., for example, 360 to 380° C. Heating the assembly may be carried out via convective heating, for example, using a suitable furnace, such as a continuous line furnace.

Alternatively, the dried paste may be fired via radiative heating, for example, by irradiating the dried coating with an appropriate source of radiation.

Where the dried coating is fired by irradiating with radiation, the source of radiation may be, for example, a laser or an infrared lamp. Ideally, the wavelength of the radiation is such that the radiation is easily transmitted through the substrates to be sealed. In this manner, the radiation may pass through the substrates without significant absorption, leaving the substrates relatively unheated, while at the same time the laser energy is absorbed by the glass frit present, thereby selectively heating the dried paste to affect the firing thereof.

In some embodiments, firing of the dried coating may be carried out using a combination of convective and radiative heating. In some embodiments, convective and radiative heating may be employed in parallel to effect firing of the particle mixture. In other embodiments, convective and radiative heating may be employed in sequence. For example, firing of the dried paste may be affected by first heating the assembly via convective heating, followed by irradiating the dried coating with an appropriate source of radiation.

In the method of forming a seal or bond between two inorganic substrates, each inorganic substrate may be a glass substrate, a ceramic substrate or a metal substrate. In a preferred embodiment, each substrate is a glass substrate, for example, a borosilicate glass substrate or a chemically tempered or thermally tempered soda lime glass substrate. The inorganic substrates preferably have a CTE in the range 4 to $9 \times 10^{-6}$/K.

The compositions and pastes may, for example, be employed in the formation of seals (e.g. hermetic seals) in the manufacture of articles which require encapsulation of sensitive components in an inert atmosphere (such as organic light emitting diode (OLED) displays, plasma display panels, semiconductor chips, sensors, solar cells, optical components or the like), or in articles which comprise an evacuated void (such as vacuum insulated glass (VIG) window units).

The present specification also provides an article comprising at least two inorganic substrates being connected by a bond or a seal, wherein the bond or seal is obtained or obtainable by a method as hereinbefore described. Preferably, the article is a vacuum insulated glass unit (e.g. a vacuum insulated glass window). Alternatively, the article is an OLED display. FIG. 1 shows a typical sealed unit comprising two spaced apart substantially parallel glass substrates 1 and 2 which are edge-sealed by a frit sealant material 3. FIG. 1(*a*) shows a top view and FIG. 1(*b*) shows a side view.

-continued

| Raw material | Impurities grade |
|---|---|
| $TeO_2$ | 99.0 |
| $Bi_2O_3$ | 99.5 |
| ZnO | 99.7 |
| $MnCO_3$ | 95.0 |
| $Li_2CO_3$ | 99.0 |
| $Na_2CO_3$ | 99.0 |
| $K_2CO_3$ | 99.0 |
| $H_3BO_3$ | 99.0 |
| $H_2WO_4$ | 99.0 |
| $Nb_2O_5$ | 99.0 |
| $MoO_3$ | 99.0 |
| $SiO_2$ | 99.6 |
| $Al_2O_3$ | 99.5 |

Preparation of Glass Frits

Glass frits were prepared using commercially available raw materials. The actual composition of each glass frit as determined by ICP is given in Table 2 below.

TABLE 2

| | Glass Frit Composition, wt % | | | | | | | | | | |
|---|---|---|---|---|---|---|---|---|---|---|---|
| | A | B | C | D | E | F | G | H | I | J | K |
| $V_2O_5$ | 61.23 | 60.52 | 58.45 | 49.27 | 45.70 | 40.70 | 39.81 | 39.27 | 38.56 | 38.38 | 38.20 |
| $P_2O_5$ | 30.02 | 29.00 | 28.27 | 22.09 | 22.57 | 17.71 | 18.65 | 17.60 | 17.11 | 18.56 | 18.15 |
| $TeO_2$ | <0.01 | <0.01 | <0.01 | 10.62 | 11.33 | 19.39 | 18.39 | 18.26 | 18.51 | 18.26 | 18.01 |
| $Bi_2O_3$ | <0.01 | <0.01 | <0.01 | 7.56 | 7.08 | 11.06 | 10.94 | 10.52 | 10.78 | 10.67 | 10.56 |
| ZnO | 8.90 | 10.74 | 10.59 | 6.26 | 6.25 | 5.51 | 5.55 | 5.48 | 5.44 | 7.41 | 9.04 |
| MnO | <0.01 | <0.01 | 1.33 | 2.09 | 3.20 | 2.75 | 2.69 | 2.67 | 2.65 | 1.29 | 0.12 |
| $B_2O_3$ | <0.01 | <0.01 | <0.01 | 0.74 | 0.77 | 1.90 | 1.26 | 1.22 | 1.16 | 1.19 | 1.32 |
| $K_2O$ | 0.02 | 0.02 | 0.05 | 0.03 | 0.03 | 0.03 | 0.02 | 2.01 | 0.69 | 0.67 | 0.63 |
| $Na_2O$ | 0.05 | 0.05 | 0.19 | 0.12 | 0.12 | 0.05 | <0.01 | <0.01 | 0.62 | 0.62 | 0.59 |
| $Li_2O$ | <0.01 | <0.01 | <0.01 | 0.69 | 0.71 | 1.25 | <0.01 | <0.01 | 0.47 | 0.50 | 0.47 |
| $MoO_3$ | <0.01 | <0.01 | <0.01 | 0.42 | 0.44 | 0.39 | 0.35 | 0.35 | 0.36 | 0.33 | 0.35 |
| $Nb_2O_5$ | <0.01 | <0.01 | <0.01 | 1.32 | 1.33 | 0.36 | 0.33 | 0.33 | 0.33 | 0.33 | 0.31 |
| $WO_3$ | <0.01 | <0.01 | <0.01 | <0.01 | <0.01 | 1.10 | 1.10 | 1.15 | 1.08 | 1.06 | 1.10 |
| $SiO_2$ | 0.40 | 0.1 | 0.92 | 0.06 | 0.28 | 0.10 | 0.45 | 0.36 | 0.41 | 0.32 | 0.28 |
| $Al_2O_3$ | 0.28 | 0.2 | 0.43 | 0.09 | 0.34 | 0.12 | 0.40 | 0.34 | 0.34 | 0.25 | 0.15 |
| $T_g$, °C. | 399 | 411 | 404 | 356 | 344 | 335 | 349 | 344 | 347 | 353 | 350 |
| $T_f$, °C. | 392 | 420 | 387 | 380 | 360 | 355 | 370 | 360 | 365 | 377 | 370 |
| $T_{peak}$, °C. | 527 | 541 | 515 | 540 | 550 | 548 | N/A | N/A | N/A | N/A | 630 |
| CTE × $10^{-6}$/K | 7.1 | 6.9 | 7.0 | 8.3 | 9.0 | 9.5 | 9.9 | 10.4 | 10.2 | 9.6 | 9.4 |
| D(50), μm | 9.7 | 8.7 | 8.6 | 7.5 | 9.4 | 9.2 | 7.4 | 8.1 | 6.5 | 7.0 | 7.3 |

The present specification also provides for the use of a composition as hereinbefore described to form a paste and for the use of a composition or paste as hereinbefore described to form a seal or bond between two substrates, e.g. the use of a composition or paste as hereinbefore described to form a vacuum insulated glass unit or the use of a composition or paste as hereinbefore described to form an OLED display.

EXAMPLES

The invention will now be further described with reference to the following examples, which are illustrative, but not limiting of the invention.

Materials

Glass frits and sintered compositions were prepared using commercially available raw materials. Table 1 below summarizes the raw materials used:

| Raw material | Impurities grade |
|---|---|
| $V_2O_5$ | >99.6 |
| $NH_4H_2PO_4$ | 98.0 |

The raw materials were mixed in a Turbula mixer (WAB: Willy A Bachofen, Switzerland) for 45 minutes before being melted in a corundum crucible in a Carbolite muffle furnace at a temperature of 950° C. for 45 min. After melting, the glass was quenched onto a copper plate. The as obtained glass solid was crushed and then dry-milled in a planetary mill (Retsch PM 100) to a particle size distribution (PSD) of D(50)<10 μm. The coefficient of thermal expansion (CTE) of the glass frits was measured using a dilatometer (BAHR Thermo analyse, DIL 803). The glass transition temperature ($T_g$), the softening temperature ($T_f$), the $T_{peak}$ crystallization of the glass frits were measured using a differential scanning calorimetry (PerkinElmer DSC 8000) and a Misura hot-stage microscope (HSM, Expert System Solutions).

The results show that additions of appropriate levels of $TeO_2$ and $Bi_2O_3$ lower the glass transition temperatures significantly from 411 to 335° C.

Figure 2:
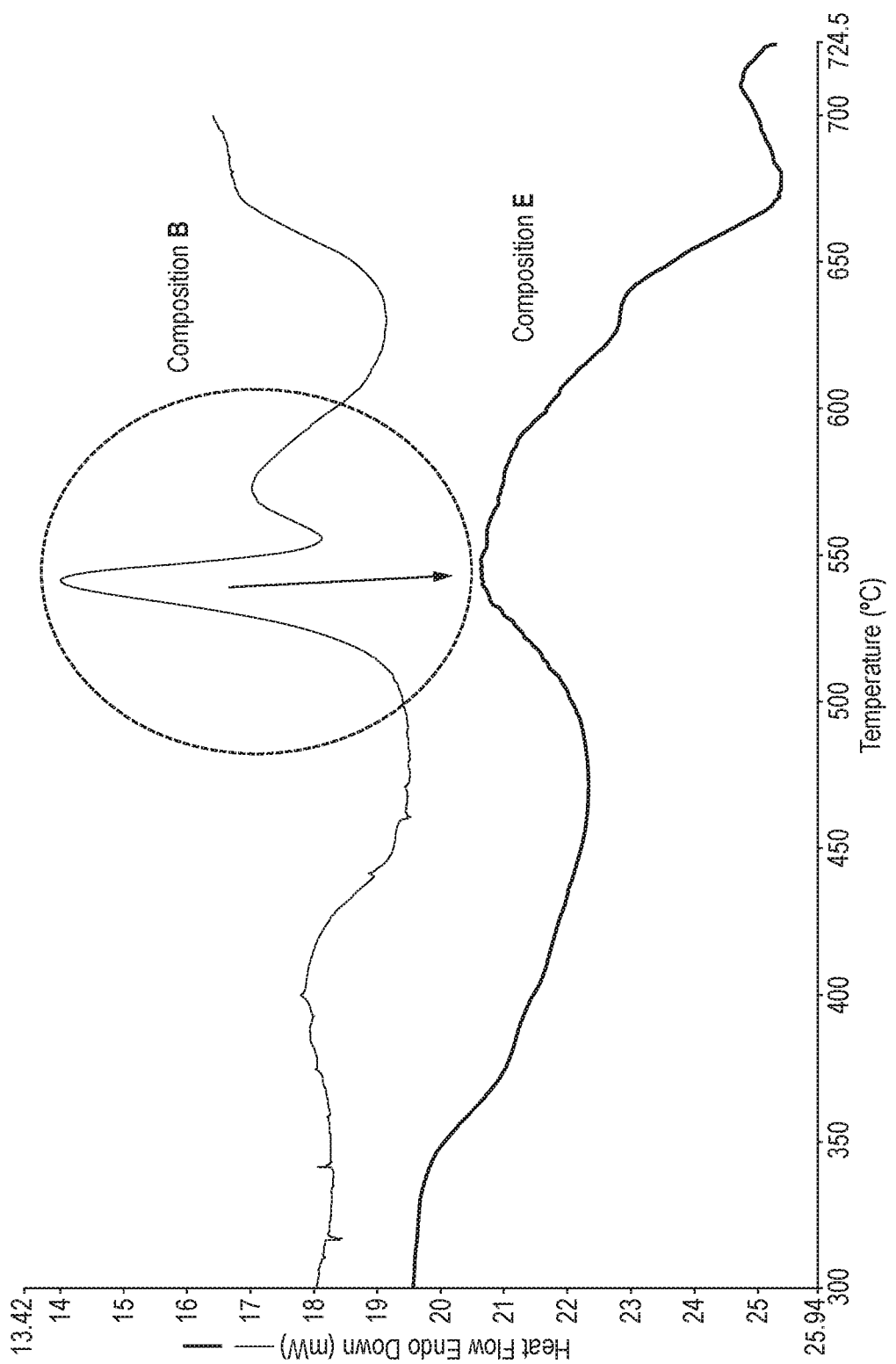
FIGS. 2 and 3 shows differential scanning calorimetry results for three different glass compositions B, E and G—results indicate that changes in composition from B to E and G suppress crystallization peaks in the dotted circle and reduce glass transition temperature as arrowed.

Furthermore, the addition of low levels of MnO at the expense of ZnO effectively reduces the crystallisation tendency of the frit, as illustrated in FIG. 2 showing that two strong crystallisation peaks as dotted circled occur in composition B (with no MnO addition) and the crystallisation in similar temperature range is significantly diminished in composition E (with MnO addition). Furthermore, the crystallisation tendency is completely suppressed in Composition G (also with MnO addition) in FIG. 3.

Figure 3:
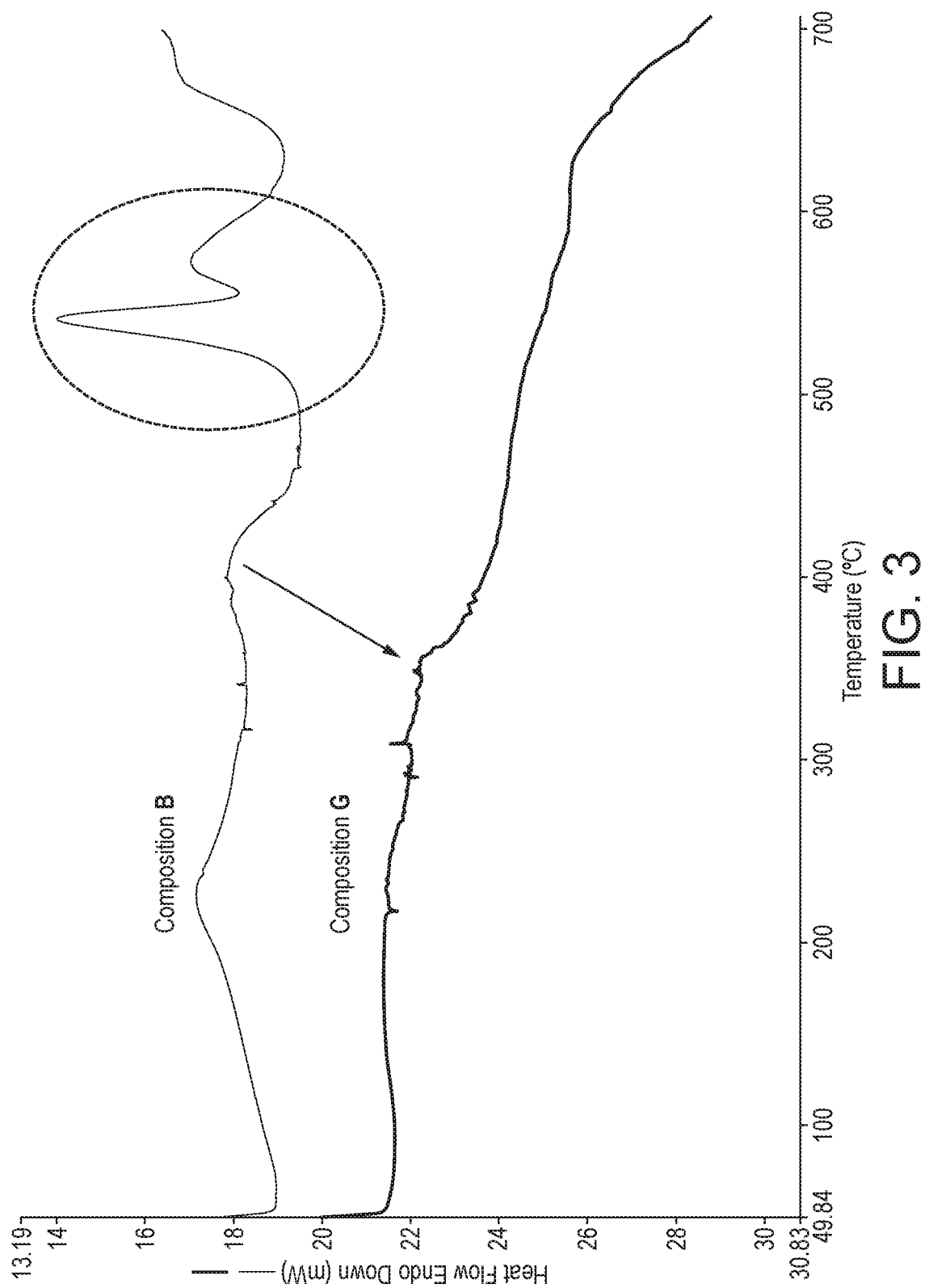

FIG. 3 also reveals the noticeable reduction in $T_g$ (as arrowed) by various compositional changes made from composition B to G.

Figure 4:
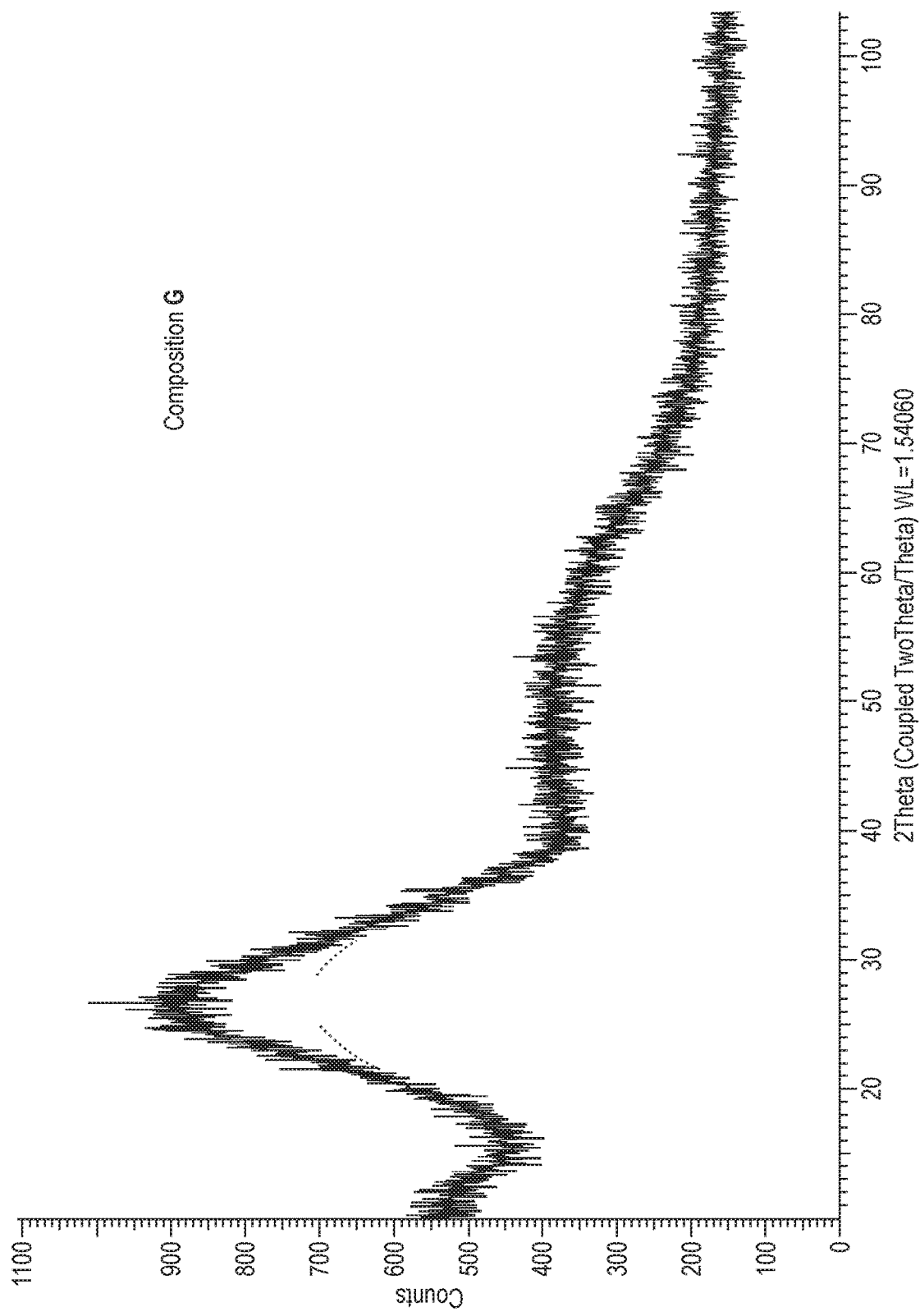
FIG. 4 shows an XRD diffraction pattern of composition G confirming the amorphous nature of the composition.

The XRD diffraction pattern shown in FIG. 4, also confirms the amorphous nature of composition G.

Addition of low levels of $TeO_2$ and $Bi_2O_3$ evidently increased the thermal expansion coefficients (CTE) of the frits. It was therefore necessary to dope with low level of low-CTE fillers to some of the frit compositions as listed in Table 2. Common CTE fillers include a zirconium oxide material, an aluminium oxide material, cordierite, or an aluminosilicate glass frit.

The glass frits employed in the compositions of the present specification preferably have a $d_{50}$ particle size of less than 15 μm. In some embodiments, the particles of the glass frit may have a $d_{50}$ particle size of 1 to 10 μm, preferably 2 to 8 μm, more preferably 3 to 7 μm.

The term "$d_{50}$ particle size" herein refers to particle size distribution, and a value for $d_{50}$ particle size corresponds to the particle size value below which 50%, by volume, of the total particles in a particular sample range. The $d_{50}$ particle size may be determined using a laser diffraction method (e.g. using a Malvern Mastersizer 3000).

Preparation of Pastes

The pastes comprise a particle mixture as described above and a dispersion medium. The pastes may be applied to a substrate (e.g. via printing) in order to deposit the particle mixture onto the substrate.

As used herein, the term "dispersion medium" refers to a substance which is in the liquid phase at the conditions intended for application of the paste to a substrate (i.e. printing conditions).

The dispersion medium adequately suspends the particle mixture at application conditions and is removed completely during drying of the applied paste and/or firing of the deposited particle mixture. Factors influencing the choice of medium include solvent viscosity, evaporation rate, surface tension, odour and toxicity. Suitable mediums preferably exhibit non-Newtonian behaviour at printing conditions. Suitably, the medium comprises one or more of water, alcohols, glycol ethers, lactates, glycol ether acetates, aldehydes, ketones, aromatic hydrocarbons and oils. Mixtures of two or more solvents are also suitable.

The pastes may further comprise one or more additives. These may include dispersants, binders, resins, viscosity/rheology modifiers wetting agents, thickeners, stabilisers and surfactants.

The pastes may comprise from about 30 to about 95 wt. % of the particle mixture described above, more preferably about 40 to about 92 wt. %, and further comprise about 5 to about 70 wt. % of the dispersion medium based on total weight of the paste. For example, suitable pastes may be prepared by mixing the powder compositions A-K with a tridecylalcohol-based medium in a ratio of 4:1 using a speed mixer, before triple milling twice. The resultant pastes had a solid content of 80 wt % based upon the total weight of the paste.

Preparation of Sealed Articles

Pastes were prepared according to Examples A-K then used to seal two glass substrates, via either a convective or radiative firing method.

A prepared paste was applied to two 3.8 mm thick soda lime glass substrates by screen printing using a 90-mesh screen. The wet layer thickness was 50 μm. After printing, the plates were dried at 140° C. for 10 min, placed on top of each other, clamped under a force of 18 N, and fired. The firing cycle was as follows: (i) heat 10° C./min until a firing temperature between 350 to 420° C. is reached; (ii) fire at the desired firing temperature for 20 min; and (iii) cool to room temperature at a rate of 10° C./min.

Evaluation of Properties

Table 3 summarises the overall properties of the obtained sealed articles.

TABLE 3

| | Properties of the seals | | | | | | | | | | |
|---|---|---|---|---|---|---|---|---|---|---|---|
| | A | B | C | D | E | F | G | H | I | J | K |
| Sealing temperature (° C.) | 460 | 460 | 440 | 420 | 400 | 360 | 380 | 370 | 370 | 380 | 380 |
| Seal strength | | | | | | Accepted | | | | | |

Sealing Temperature

The addition of low levels of $Bi_2O_3$ and $TeO_2$ to compositions A-C led to a significant decrease in the sealing temperature from 460° C. to 360-380° C.

Additionally, the particle size of the frit powders may be further reduced by employing a jet milling process. Powders of selective compositions from Table 2 A to K may be jet-milled to achieve a $d_{90}$<3 micron, which may lead to a further reduction by 20-30° C. in the sealing temperature to 330-350° C.

Evaluation of Seal Strength

Each of the sealed glass articles was subjected to wafer bond testing, whereby a razor blade was forced between the two glass plates. An article which experienced substrate breakage first while the seal remained intact was evaluated as "Accepted". An article which experienced delamination of the seal prior to breakage of the substrate was evaluated as "Rejected". All tested samples demonstrated "Accepted" seal strength (see Table 3).

While this invention has been particularly shown and described with reference to certain embodiments, it will be understood to those skilled in the art that various changes in form and detail may be made without departing from the scope of the invention as defined by the appended claims.

The invention claimed is:

1. A composition for sealing inorganic substrates, the composition comprising a glass frit, wherein said glass frit comprises:
   30 to 65 wt % $V_2O_5$;
   5 to 35 wt % $P_2O_5$;
   5 to 25 wt % $TeO_2$;
   5 to 25 wt % $Bi_2O_3$;
   2 to 12 wt % ZnO;
   1 to 4 wt % MnO;
   0 to 5 wt % $B_2O_3$;
   0 to 5 wt % total alkali metal oxides;
   0 to 2 wt % $Nb_2O_5$;

0 to 2 wt % $WO_3$;
0 to 2 wt % $MoO_3$;
0 to 2 wt % $SiO_2$; and
0 to 2 wt % $Al_2O_3$.

2. The composition according to claim 1, wherein said glass frit comprises:
32 to 55 wt % $V_2O_5$.

3. The composition according to claim 1, wherein said glass frit comprises:
10 to 30 wt % $P_2O_5$.

4. The composition according to claim 1, wherein said glass frit comprises:
8 to 25 wt % $TeO_2$.

5. The composition according to claim 1, wherein said glass frit comprises:
6 to 20 wt % $Bi_2O_3$.

6. The composition according to claim 1, wherein said glass frit comprises:
5 to 10 wt % ZnO.

7. The composition according to claim 1, wherein said glass frit comprises:
2 to 5 wt % MnO.

8. The composition according to claim 1, wherein said glass frit comprises:
0 to 4 wt % $B_2O_3$.

9. The composition according to claim 1, wherein said glass frit comprises:
0 to 4 wt % total alkali metal oxides.

10. The composition according to claim 1, wherein said glass frit has a $d_{90}$ particle size of less than 50 μm.

11. The composition according to claim 1, further comprising a filler material.

12. A paste comprising a composition according to claim 1 and an organic medium.

13. A method of forming a seal or bond between two inorganic substrates using the paste of claim 12.

14. The method according to claim 13, the method comprising:
(i) providing a first inorganic substrate;
(ii) providing a second inorganic substrate;
(iii) depositing the paste onto at least a portion of at least one of the inorganic substrates;
(iv) drying said paste to form a dried paste;
(v) optionally pre-firing the dried paste to remove organic medium;
(vi) assembling the first and second substrates such that the dried paste lies therebetween and in contact with both substrates; and
(vii) firing said dried paste.

15. The method as claimed in claim 14, wherein in step (vii) the dried paste is fired via convective heating or via radiative heating.

16. An article comprising at least two inorganic substrates being connected by a bond or a seal, wherein the bond or seal is obtained or obtainable by the method as claimed in claim 13.

17. The article as claimed in claim 16, which is a vacuum insulated glass unit.

* * * * *